Sept. 6, 1927.
C. H. BATCHELDER
1,641,797
LINK BRACELET
Filed July 31, 1926
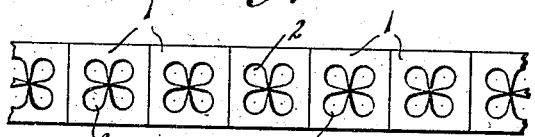
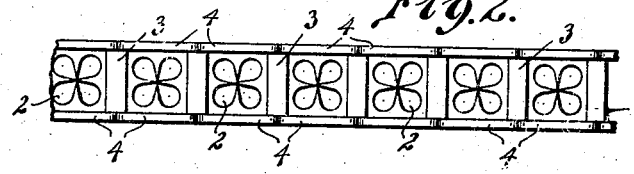
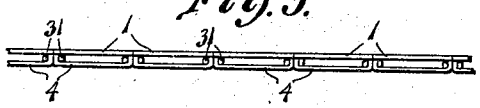
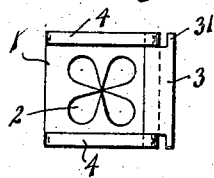
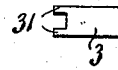
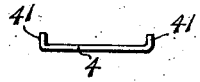
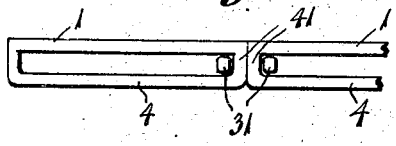
INVENTOR
Charles H. Batchelder,
By Mitchell, Chadwick & Kent,
ATTORNEYS.

Patented Sept. 6, 1927.

1,641,797

UNITED STATES PATENT OFFICE.

CHARLES H. BATCHELDER, OF NORTH ATTLEBORO, MASSACHUSETTS.

LINK BRACELET.

Application filed July 31, 1926. Serial No. 126,226.

My invention is a bracelet or chain the links of which are flexible in one direction to form a circle the several links of which are secured together by a forked connecting bar and the connecting bar is secured in its holding position by the links which it engages.

In the drawings:

Figures 1 and 2 are respectively plan views of the front and the back or inside of a part of a bracelet or chain;

Figure 3 is a side view of connected links at one stage of assembly;

Figure 4 is a similar view after assembly is complete;

Figure 5 is a rear or inside plan view of one link with side bars and a connector in place;

Figure 6 is a plan of a connector;

Figure 7 is a side view of a side bar;

Figure 8ª is a side view of a pair of links connected, on an enlarged scale and before the side bar bending operation;

Figure 8ᵇ is a similar view, after the side bar bending operation, the effects of which are exaggerated for clearness.

In the quantity manufacture of jewelry it is essential that economical and durable devices and processes of manufacture be employed and this is especially true of such articles as bracelets, necklaces and the like, having moving and jointed parts, for with complicated jointing devices the labor in assembly may nullify the savings of machine made parts.

My invention is designed to produce a connector for links and a link which after the connector has been placed between a pair of links to connect them, may be, by a simple pressing operation on each link, caused to lock the connector inescapably between and connecting the links and, by the same operation draw the opposed ends of the several links apart to give a desired capacity of flexure.

In the drawings 1 is the ornamental face or front of a link, the ornamentation shown in the drawings being a pierced design 2 visible on both the front and the back of the ornamental face plate (see Figs. 1 and 2); 3 is a connector element, consisting of a rectangular flat piece having at both ends extensions 31 forming a fork; 4 is a side bar, the ends 41 of which are turned at right angles to the main part of the bar. The thickness of the connector 3 and its extensions 31 is only a trifle less than the distance between the back of the face plate 1 and the inner side of side bars 4.

The parts of the bracelet or chain are three only, the face plate 1, the side bars 4 and the connector 3. In the assembly, a pair of side bars 4 are soldered or otherwise secured by the upturned ends 41, longitudinally, along opposite sides of the face plate 1. A connector 3 is then held edgewise between and parallel with the side bars and is then turned to a position at right angles to the side bars, the side bars being received in the recess between the projections 31. The connector is then moved to one end of the side bars onto the ends 41. The link and connector are then connected to a second link in the same manner, the connector being placed between the side bars of the second link and the first link and connector 3 turned until the side bars of the second link enter between ends 31 of the connector, the recess between which ends 31 is wide enough to receive a pair of the ends 41 of the side bars 4. The links being drawn longitudinally the connector engaging the side bars of the second link will slip along to that end of the second link opposed to the end of the first link and down upon the ends 41 of the side bars 4 of the second link, thus coupling the two links together. The process is repeated until a chain of the desired length is formed.

A connection such as has been described is illustrated in Figure 4, which shows the ends 41 of adjacent links both perpendicular to the under side of face plate 1 and in substantial contact. It is obvious therefore that the flexibility of the chain will be slight, such flexibility as it may have being due solely to play between the ends 31 of the connectors and the ends 41 of the side bars, and this play of loose connection is obviously undesirable and to be reduced to such a minimum as is practicable in manufacture. It is necessary to therefore provide a capacity of flexure inwardly sufficient to form a circle of the designed diameter of the bracelet or the like. This is accomplished in my bracelet, as will be hereinafter described.

If the chain or bracelet were subject only to longitudinal strains and longitudinal flexures, the forked connector and side bars, as shown in Figure 4 would form a secure connection. But chains and especially chain bracelets in use are subject to strains in all directions. Bracelets are removed and thrown upon a table without care. The links may be forced toward one another and the chain may be flexed inwardly until the side bars 4 on adjacent links are opposed or in contact and in such a case the connector can slip along the side bars and a very slight transverse strain will then reverse the process of assembly and a pair of links become disengaged.

To avoid this and make a secure connection; after a pair of links has been assembled and connected, the side bars 4 are bent toward the face plate 1 (see Fig. 3) from their original configuration when the links are first assembled, as shown in Figure 4. The connector ends 31 are thus confined and cannot move along the side bars 4 as the space between the inner side of side bars 4 and the inner surface of face plate 1 is insufficient to permit the passage of the ends 31 of connector 3. The operation of assembly cannot therefore be reversed.

By the same pressing operation which forces in the side bars 4 to confine the ends 31 of the connector 3, the unsecured ends 41 of side bars 4 are drawn together to give to the chain or bracelet that capacity of flex which, as shown in Figure 4, it lacks, the result of the bending of the side bars 4 and the drawing of the ends 41 together being to form a minute V between the opposed ends 41 on adjacent links. I have shown in Figures 8ª and 8ᵇ a pair of links before the pinching of the side bars, the effect in Figure 8ᵇ being somewhat exaggerated for the sake of clearness.

The result therefore is a chain or bracelet of extreme simplicity, having only three parts, the links of which are connected so as to be flexible in only one direction namely, inwardly, to give capacity for forming a circle with the side bars in the inside of the circle; the assembly of links in pairs and their connection by a connector is an operation so simple that it may be performed by unskilled labor and the final securing of the parts together by bending the side bars inwardly not only confines the connector and prevents it from becoming disengaged but by the same simple operation draws in the unsecured ends of the side bars on each link from the opposed ends of the side bars on the companion link thus permitting flexure inwardly until the opposed ends of the side bars on adjacent links are in contact.

I claim:

The chain or bracelet above described, made up of a multiplicity of links each comprising a face plate and parallel side bars upon the inside of the face plate respectively secured at and parallel to the longitudinal sides of the face plate and spaced apart from the face plate by perpendicular ends upon the side bars to form a longitudinal slot; a multiplicity of connectors each having two projections at each of its ends which respectively enter the longitudinal slots of adjacent links to secure the links together, the side bars being bent toward the face plate at their middle to narrow the slots to confine the connector projections and to draw the perpendicular ends of the side bars away from the opposed ends of the side bars of the companion links, to form a flexing space between companion links.

Signed at North Attleboro, Massachusetts, this twenty-third day of July, 1926.

CHARLES H. BATCHELDER.